US007023546B1

(12) United States Patent
McMillan

(10) Patent No.: US 7,023,546 B1
(45) Date of Patent: Apr. 4, 2006

(54) REAL-TIME IMAGING SPECTROPOLARIMETER BASED ON AN OPTICAL MODULATOR

(75) Inventor: Robert W. McMillan, Owens Cross Roads, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 344 days.

(21) Appl. No.: 10/693,844

(22) Filed: Oct. 21, 2003

(51) Int. Cl.
*G01N 4/00* (2006.01)

(52) U.S. Cl. .................................................... 356/364

(58) Field of Classification Search ..................... None
See application file for complete search history.

(56) References Cited

U.S. PATENT DOCUMENTS

| | | | | |
|---|---|---|---|---|
| 5,608,413 | A | 3/1997 | Macdonald | |
| 5,764,182 | A | 6/1998 | Durand | |
| 5,793,905 | A | 8/1998 | Maier et al. | |
| 5,815,121 | A | 9/1998 | Collier | |
| 5,890,095 | A | 3/1999 | Barbour et al. | |
| 6,043,887 | A | 3/2000 | Allard et al. | |
| 6,118,537 | A * | 9/2000 | Johs et al. | 356/369 |
| 6,490,043 | B1 * | 12/2002 | Kebabian | 356/453 |
| 6,674,532 | B1 * | 1/2004 | VanDelden | 356/491 |

OTHER PUBLICATIONS

Innarili et al., "Polarimetric-Spectral Intensity Modulation (P-SIM) . . . Imaging", SPIE Conference, Orlando, FL, Apr. 1999.

Oka, K. and Kato, T. "Spectroscopic Polarimetry . . . Spectrum", Optics Letters, Nov. 1, 1999, vol. 24.

Sabatke et al, "Optimization of Retardance . . . Polarimeter", Optics Letters, vol. 25, No. 11, Jun. 1, 2000.

Goldsmith, P., "Quasioptical Systems", IEEE Press, pp. 71-77.

Born, M. and Wolf, E., "Principles of Optics", Pergamon Press pp. 30-32 and 554-555.

(Continued)

*Primary Examiner*—Tu T. Nguyen
(74) *Attorney, Agent, or Firm*—USA Space and Missile Defense Command

(57) ABSTRACT

An imaging spectropolarimeter for measuring the polarization and spectral content and the spatial signature of a target scene. The imaging spectropolarimeter includes an objective optic for receiving an electromagnetic signal and a modulator for modulating the electromagnetic signal The amplitude of each frequency component of the resulting modulated electromagnetic signal is a function of the particular polarization state of each frequency component of the electromagnetic signal. A linear polarizer passes a single polarization of the modulated electromagnetic signal to a tunable filter, which is tunable through a frequency spectrum. The tunable filter outputs a plurality of electromagnetic signal samples at predetermined frequency increments. A focal plane array receives each electromagnetic signal sample and outputs a spectrum signal and a processor applies Fourier transformation to the spectrum signal to obtain at least one Stokes polarization vector component for each pixel within the scene.

16 Claims, 2 Drawing Sheets

OTHER PUBLICATIONS

McMillan et al., "An Experimental 225 GHz Pulsed Coherent Radar", Transactions on Microwave Theory and Techniques, Mar. 1991.
Gribbin, J. "Schrodinger's Kittens . . . Reality", pp. 109-115.
Sabatke et al. "A Snapshot Imaging Spectropolarimeter", Procee. of the Multi/Hyperspectral Sensors . . . Workshop, Red. Ars. Nov. 7-9, 2000.
U.S. Appl. No. 10/341,151, filed Jan. 13, 2003, Entitled "A Device and Method For Determining all Components of the Stokes Polarization Vector Within a Radar Signal".
M. Strassner, C. Luber, A. Tarraf, and N. Chitica, "Widely Tunable Constan Bandwidth Monolithic Fabry-Perot Filter With a Stable Cavity Design for WDM Systems", IEEE Photonics, vol. 14, Nov. 2002, pp. 1548-1550.

* cited by examiner

REAL-TIME IMAGING SPECTROPOLARIMETER BASED ON AN OPTICAL MODULATOR

BACKGROUND OF THE INVENTION

1. Field of the Invention

The present invention relates to devices and methods for measuring a state of polarization as well as the spectral content of each picture element (pixel) of a target scene and, more particularly, to devices and methods for measuring a state of polarization as well as the spectral content of each pixel in a target scene in real time.

2. Related Art

Identifying the state of polarization of an electromagnetic wave by determining the Stokes polarization vector components of the wave is known. In particular, an electromagnetic wave, such as a spectral band of light, or of electromagnetic radiation in any spectral band, may be characterized as having four Stokes vector components ($s_0$, $s_1$, $s_2$, and $s_3$). The component $s_0$ is proportional to the intensity of the wave. The components $s_1$, $s_2$, and $s_3$ may be related to the orientation of the polarization, e.g., an ellipse and its ellipticity.

One way of measuring the Stokes vector components ($s_0$, $s_1$, $s_2$, and $s_3$) is to place two polarizers and a retarder in the optical path sequentially. Insertion of a first polarizer into an optical path gives a measure of one of the linear polarizations and a second polarizer is also inserted to give the other linear polarization. A retarder is further inserted into the optical path to retard a signal having a given sense of polarization in phase relative to a signal having another sense, where the two senses are generally orthogonal to each other. Output from the retarder is a signal containing data that can be used to calculate the phase when the linear components are known. The disadvantage of this approach is that it involves moving parts, since these optical components must be placed successively in the optical path. Also, in a dynamic scene, a polarimeter using moving parts would give smeared results, since the scene could change during the times that the polarizers are being changed.

Additionally, measurement of the spectrum of each pixel in a scene is currently accomplished by using some type of scanning spectrometer such as a grating spectrometer or a Michelson interferometer. The grating spectrometer collects light from the scene and scans it across a detector. The grating is designed so that there is a near one-to-one correspondence between the wavelength of radiation incident on the detector and the scan angle of the grating. The Michelson interferometer uses a scanning mirror to collect an interferogram, the Fourier transform of which yields the spectrum of the scene. The disadvantage of both of these means of generating the spectral content of each pixel is that they both require moving parts, namely a scanning grating or a scanning mirror, to collect spectral information for each pixel in a target scene.

In order to avoid moving polarizers into and out of the beam, a system for spectropolarimetry was described by Kazuhiko Oka and Takayuki Kato in "Spectroscopic Polarimetry with a Channeled Spectrum", published in *Optics Letters*, Vol. 24, No. 21, Nov. 1, 1999. In particular, Oka and Kato employ a pair of birefringent retarders and an analyzer to modulate light so that the state of polarization of the light varies with frequency. The modulated light is then passed to a grating spectrometer or spectrum analyzer and then to a computer where, through Fourier analysis, the state of polarization of the modulated light is determined. A disadvantage of this approach is, again, the necessity for moving parts, namely a scanned diffraction grating, in the spectrometer. Also, Sabatke, et al., in *Optical Engineering* Vol. 41, No. 5, May 2002, describe an imaging spectropolarimeter that uses two optical retarders and a polarizer, together with a computed tomographic imaging spectrometer (CTIS), to measure a complete Stokes vector while employing no moving parts. However, the Sabatke system suffers from a deficiency of a limited spatial resolution by the need to use most of the focal plane area for higher grating orders.

SUMMARY OF THE INVENTION

In accordance with an embodiment of the present invention, an imaging spectropolarimeter is provided for measuring both polarization and spectral content of each pixel of a target scene. The imaging spectropolarimeter may comprise an objective optic for receiving an electromagnetic signal and a modulator optically connected with the objective optic for modulating the electromagnetic signal whereby a modulated electromagnetic signal results wherein the amplitude of each frequency component of the modulated electromagnetic signal is a function of the particular polarization state of each frequency component of the electromagnetic signal. A linear polarizer may be configured to pass a single polarization of the modulated electromagnetic signal through an output thereof. A tunable filter may be optically connected to receive the single polarization of the electromagnetic signal and may be tunable through a frequency spectrum. The tunable filter may be configured to output a plurality of electromagnetic signal samples at predetermined frequency increments. A focal plane array may be configured to receive each electromagnetic signal sample and output a spectrum signal and a processor may be configured to apply Fourier transformation to the spectrum signal to obtain at least one Stokes polarization vector component for each pixel in the target scene. In this way, the spatial, spectral, and polarization signatures of the target scene are obtained.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE PREFERRED EMBODIMENT

One embodiment of the present invention concerns an imaging spectropolarimeter which increases spatial resolution by reducing the effects of higher grating orders on the focal plane array occurring during diffraction of the electromagnetic signal. In this embodiment, the imaging spectropolarimeter may comprise a tunable filter, such as an acousto-optic modulator or an electro-optic modulator, to achieve increased spatial resolution. In operation, the imaging spectropolarimeter collects a broadband signal which propagates through a modulator and then into a tuning filter which may comprise an acousto-optic modulator or a Fabry-Perot interferometer. In this way, spatial, spectral, and polarimetric data are collected for each pixel in the focal plane.

Figure 1:
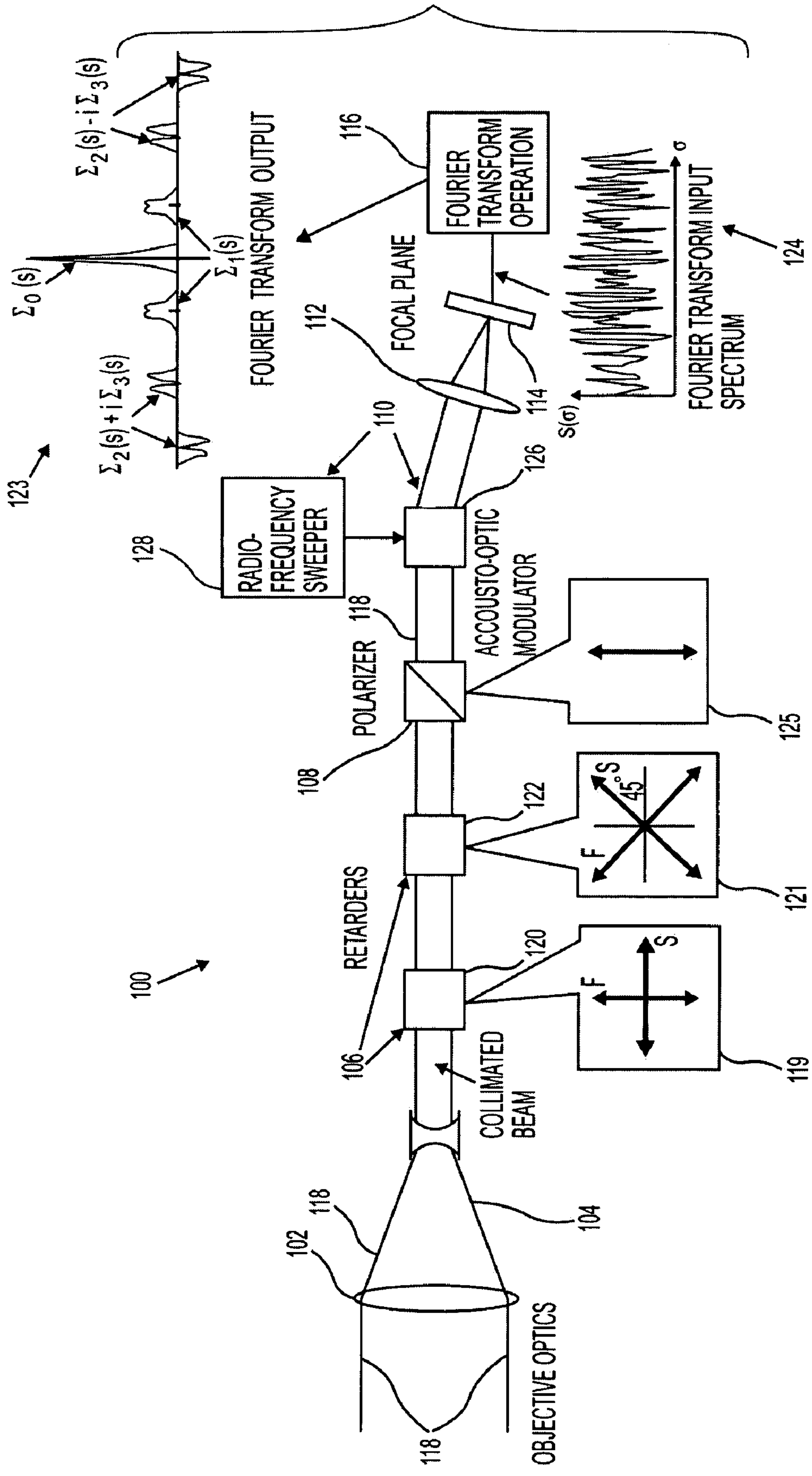
FIG. 1 is a diagrammatical view showing a spectropolarimeter in accordance with one embodiment of the present invention along with a graph of a Fourier transform input and a graph of a Fourier transform output.

Referring now to FIG. 1, an imaging spectropolarimeter in accordance with an embodiment of the present invention is shown generally at 100. In this embodiment, the spectropolarimeter 100 functions to provide an increase in spatial resolution by reducing the effects of higher grating orders occurring during diffraction of the electromagnetic signal. The imaging spectropolarimeter 100 may comprise an objective optic 102, a collimator 104, a modulator 106, a linear polarizer 108, a tuning filter 110, a focusing optic 112, a focal plane array 114 and an analyzer 116.

The objective optic 102 is preferably employed for receipt of an electromagnetic signal 118 in the light frequency spectrum and is disposed adjacent a collimator 104 which functions in a known manner to create a collimated beam containing the electromagnetic signal. At visible or infrared wavelengths, it is believed that the beam will remain collimated through the series of components described hereafter.

The modulator 106 may comprise a pair of cascaded birefringent retarders 120, 122 each having a fast and a slow axis. The retarders 120, 122 are arranged in a known manner such that each respective fast and slow axis is oriented at an angle of 45 degrees to that of the other as shown at 119, 121. Together the retarders 120, 122 may function as a modulator to rotate the polarization vector of the electromagnetic signal 118 to a predetermined angle dependent on an input state of polarization and thereby establish a relationship between input state of polarization and frequency. For further details of an optical modulator and birefrigent retarders suitable for use in the practice of the present invention, please see U.S. patent application Ser. No. 10/341,151, filed Jan. 13, 2003, and entitled "A Device and Method For Determining All Components of the Stokes Polarization Vector Within a Radar Signal", which is incorporated herein by reference to the extent necessary to make and practice the present invention. It will be understood that the present invention is not limited to the presently disclosed arrangement for modulating the electromagnetic signal 118 and any suitable device which accomplishes this modulation function may be employed in the practice of the present invention.

The linear polarizer 108 functions to block all but a single polarization oriented as shown at 125. For the visible band, the mineral calcite may be employed in the construction of a suitable linear polarizer, although many alternative polarizer materials exist.

It will be appreciated that the output of the linear polarizer 108 contains a linearly-polarized modulated signal that includes an amplitude that is a function of the in put polarization state and the net rotations of the polarization vector caused by the retarders as described above. It is shown by Oka and Kato, in the paper entitled "Spectroscopic Polarimetry with a Channeled Spectrum" by Kazuhiko Oka and Takayuki Kato, published in *Optics Letters*, Vol. 24, No. 21, Nov. 1, 1999, which is hereby incorporated herein by reference to the extent necessary to make and use the present invention, that the Fourier transform of such a modulated signal gives the Stokes vector components.

The tuning filter 110, which will be described in more detail below, may be stepped through a spectrum via frequency or spectral increments in order to generate an intensity representative of the scene for each frequency increment and an output (in an analog format) of which is illustrated at 124. These spectral increments may then be used as inputs to an analyzer 116, comprising, e.g., an analog to digital converter and a computer, configured to generate a Fourier transform of the input. If the Fourier transform operation is performed on the output shown at 124, these components will be separated in frequency, as shown at 123. In this way, the analyzer 116 may include a processor programmed in a known manner to carry out the known steps of Fourier transformation to thereby provide one or more components of the Stokes vector. In particular, an analog-to-digital converter (ADC) converts each signal level of a spectrum, shown at 124, into a digital word. The digital data output by the ADC is processed by the computer to generate a Fourier transform. This may be accomplished using any one of several software packages, such as MATLAB™ developed by The Mathworks of Natick, Mass. From this Fourier transform, the components of the Stokes polarization vector are output as shown at 123 in FIG. 1 and may be used, for example, in target discrimination. Such a process for ascertaining the Stokes polarization components is described in detail by Oka and Kato previously incorporated herein by reference.

As described above, the tuning filter 110 may be configured to sweep through a spectrum of frequencies of interest and functions to diffract the electromagnetic signal 118 which has been modulated and linearly polarized by the retarders 120, 122 and the linear polarizer 108 about each particular frequency of interest. It will be appreciated that diffraction of the signal results in the spatial separation of various frequency components (and their respective intensity components representing polarization information pertaining to the pre-modulated and pre-polarized, or originally received, electromagnetic signal) each of which may then be analyzed by the analyzer 116 for use in determining each of the Stokes polarization vector components, shown at 123.

A focal plane array 112 may be employed to collect information concerning polarization for an entire field of view at one particular frequency of interest (which may be referred to as a spectral slice). Output from the focal plane array 112 may be a spectrum as illustrated at 124. The spectrum 124 may contain information for each pixel of the focal plane array 112 covering the field of view of the objective optic 102 in a format which may be comprehended by the analyzer 116 whereby, as it will be recognized, Stokes polarization components for each pixel may be ascertained.

In a first example of a tuning filter 110 suitable for use in the practice of the present invention, an acousto-optic modulator 126 may be employed with a radio frequency (RF) source 128 that preferably may be capable of sweeping and, more preferably, may be capable of stepping through the radio frequency spectrum at a number of predetermined frequency increments to thereby provide a series of "frames" of spectral information. The frequency steps of the acousto-optic modulator driver are synchronized with the scan rate of the camera focal plane so that the entire focal plane is scanned during each step. Each scan of the focal plane therefore generates one spectral slice for the target scene. The aggregate of these spectral slices comprises the spectral content of the scene and, in particular, the spectral content of each pixel in the scene is determined. A spectrum 124 is collected for each pixel. The Fourier transform of this spectrum yields the Stokes vector components 123 for each pixel. In a known construction, the acousto-optic modulator 126 comprises a medium which, when in the presence of an RF electric field, generates an acoustic wave which functions to diffract a corresponding frequency wave according to Bragg's law, namely $n\lambda=2d\sin\theta$ where n is the order of diffraction, $\lambda$ is the wavelength, d is the period of the electric field in the medium, and $\theta$ is the angle of diffraction.

It will be appreciated that the focal plane array may be a component of a camera system operating at known frame rate whereby each frame or spectral slice may be collected in real time. Preferably the camera system would have a frame rate that is greater than one thousand frames per second to function in real time.

Figure 2:
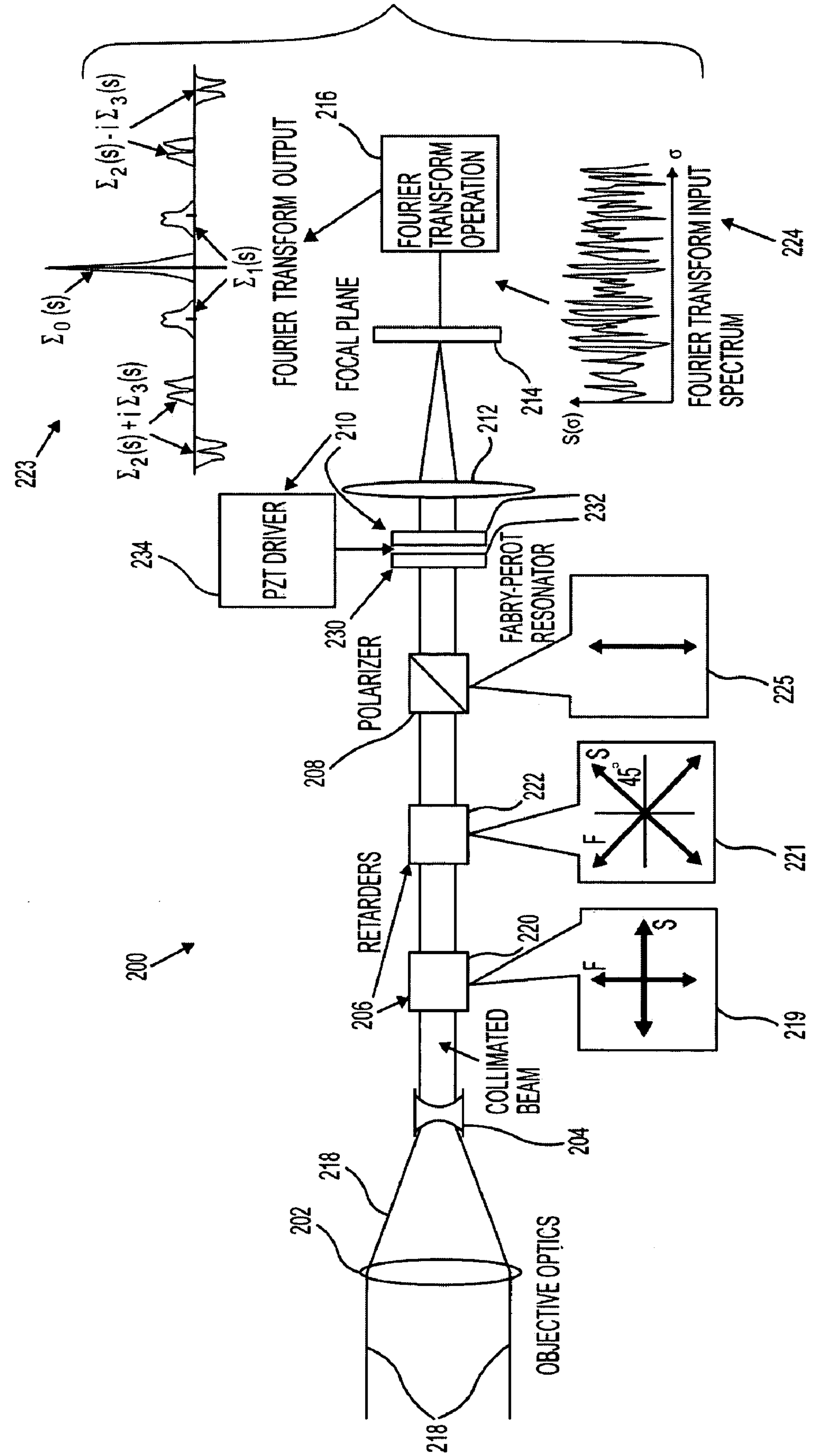
FIG. 2 is a diagrammatical view showing a spectropolarimeter in accordance with a further embodiment of the present invention along with a graph of a Fourier transform input and a graph of a Fourier transform output.

Referring now to FIG. 2, a spectropolarimeter in accordance with a further embodiment of the present invention is shown generally at 200. The spectropolarimeter 200 may be similar in many respects to the spectropolarimeter 200, described above, and accordingly similar components have been numbered similarly excepting that each begins with a numeral two. Accordingly, reference may be made to the above description of the spectropolarimeter 200 for similar components.

One feature of the spectropolarimeter 200 that has a similar function to that of the spectropolarimeter 100 but employs a different component in tuning filter 210. Tuning filter 210 comprises an electro-optic modulator, e.g., a Fabry-Perot Resonator as an electro-optic modulator 230 rather than an acousto-optic modulator as employed with tuning filter 110. The resonator 230 may comprise a known construction such as that described in the publication "Widely Tunable-Constant Bandwidth Monolithic Fabry-Perot Filter With a Stable Cavity Design for WDM Systems" by M. Strassner, C. Luber, A. Tarraf, and N. Chitica, IEEE Photonics Technology Letters, Vol. 14, No. 11, November 2002, pp. 1548–1550. In this example construction, the resonator 230 may comprise a pair of parallel optically flat plates 232 each of which may be coated with a high reflectivity coating on one side and an anti-reflective coating on the opposing side. A piezo-electric transducer (PZT) driver 234 may be used to vary the spacing between the plates which, in turn, causes variation in the resonant frequency passed by the resonator 230. The voltage scanning steps of the electro-optic modulator driver are synchronized with the scan rate of the camera focal plane so that the entire focal plane is scanned during each step. Each scan of the focal plane therefore generates one spectral slice for the target scene. The aggregate of these spectral slices comprises the spectral content of the scene and, in particular, the spectral content of each pixel in the scene is determined. A spectrum 224 is collected for each pixel. The Fourier transform of this spectrum yields the Stokes vector components 223 for each pixel.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. An imaging spectropolarimeter for measuring polarization of an electromagnetic signal, comprising:

an objective optic for receiving an electromagnetic signal;

a modulator optically connected with the objective optic for modulating the electromagnetic signal whereby a modulated electromagnetic signal results wherein the amplitude of each frequency component of the modulated electromagnetic signal is a function of the particular polarization state of each frequency component of the electromagnetic signal;

a linear polarizer configured to pass a single polarization of the modulated electromagnetic signal through an output thereof;

a tunable filter optically connected to receive the single polarization of the electromagnetic signal and being tunable through a frequency spectrum, the tunable filter being configured to output a plurality of electromagnetic signal samples at predetermined frequency increments;

a focal plane array comprising a plurality of pixels and being configured to receive each electromagnetic signal sample and output a spectrum signal for each pixel on the focal plane array; and a processor configured to apply Fourier transformation to the spectrum signal to obtain at least one Stokes polarization vector component for each pixel in the focal plane array.

2. The imaging spectropolarimeter of claim 1, wherein the tunable filter comprises an acousto-optic modulator.

3. The imaging spectropolarimeter of claim 1, wherein the tunable filter comprises an electro-optic modulator.

4. The imaging spectropolarimeter of claim 1, wherein the tunable filter is tunable through a light frequency spectrum comprising the infrared or visible portions of the spectrum.

5. The imaging spectropolarimeter of claim 1, wherein the focal plane array is mounted within a camera system.

6. The imaging spectropolarimeter of claim 5, wherein the camera system comprises a frame rate which is greater than about one thousand frames per second.

7. The imaging spectropolarimeter of claim 1, wherein the focal plane array provides information concerning intensity for each pixel of the array at each predetermined frequency increment.

8. The imaging spectropolarimeter of claim 7, further comprising an analog to digital converter operatively connected to receive each electromagnetic signal sample from the focal plane array for converting the received waveform into a digital word.

9. The imaging spectropolarimeter of claim 8, wherein the processor is further configured to receive the digital word and calculate at least one component of a Stokes polarization vector of the electromagnetic signal for each pixel in the focal plane array.

10. The imaging spectropolarimeter of claim 9, wherein the processor is further configured to calculate four Stokes vector components ($s_0$, $s_1$, $s_2$, and $s_3$) of the electromagnetic signal for each pixel in the focal plane array.

11. The imaging spectropolarimeter of claim 1, wherein the modulator comprises:

a first optically thick retarder of birefringent material wherein a fast and a slow axis of the retarder define respective x and y axes of a rectangular coordinate system; and a second optically thick retarder of birefringent material;

wherein the fast axis of the first optically thick retarder forms an angle of approximately forty-five degrees to the fast axis of the second optically thick retarder.

12. The imaging spectropolarimeter of claim 1, further comprising a focusing lens located between the tunable filter and the focal plane array.

13. An imaging spectropolarimeter for measuring polarization of an electromagnetic signal, comprising:

means for receiving an electromagnetic signal;

means for modulating the electromagnetic signal being interconnected with the receiving means whereby a modulated electromagnetic signal results wherein the amplitude of each frequency component of the modulated electromagnetic signal is a function of the particular polarization state of each frequency component of the electromagnetic signal;

means for linearly polarizing the modulated electromagnetic signal and outputting a polarized electromagnetic signal;

means for filtering the polarized electromagnetic signal being optically connected to receive the polarized electromagnetic signal and being tunable through a frequency spectrum, the filtering means also being configured to output a plurality of electromagnetic signal samples at predetermined frequency increments of the frequency spectrum;

array means for receiving each electromagnetic signal sample and outputting a spectrum signal; and processing means for applying Fourier transformation to the spectrum signal to obtain at least one Stokes polarization vector component.

14. The imaging spectropolarimeter of claim 13, wherein the means for modulating comprises:

a first optically thick retarder of birefringent material wherein a fast and a slow axes of the retarder define respective x and y axes of a rectangular coordinate system; and a second optically thick retarder of birefringent material and wherein the fast axis of the first optically thick retarder forms an angle of approximately forty-five degrees to the fast axis of the second optically thick retarder.

15. The imaging spectropolarimeter of claim 14, further comprising means for converting from analog to digital being operatively connected to receive the spectrum signal from the focal plane array for converting the spectrum signal into a digital word.

16. The imaging spectropolarimeter of claim 15, wherein the processor is further configured to receive the digital word and calculate at least one component of a Stokes polarization vector of the electromagnetic signal.

* * * * *